(12) United States Patent
Penuelas et al.

(10) Patent No.: US 9,782,900 B1
(45) Date of Patent: Oct. 10, 2017

(54) WIRE HARNESS FORMBOARD MANIPULATOR

(71) Applicant: THE BOEING COMPANY, Chicago, IL (US)

(72) Inventors: Basilio Penuelas, Mesa, AZ (US); Thomas G. Klingler, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 14/020,463

(22) Filed: Sep. 6, 2013

(51) Int. Cl.
*B65G 7/08* (2006.01)
*B25J 11/00* (2006.01)

(52) U.S. Cl.
CPC ..................... *B25J 11/00* (2013.01)

(58) Field of Classification Search
CPC .......... B65G 1/026; B65G 7/08; B65G 47/24; B65G 47/248; B25J 11/00
USPC ................ 414/778, 782, 783, 11; 280/6.151
See application file for complete search history.

(56) References Cited

U.S. PATENT DOCUMENTS

| | | | | |
|---|---|---|---|---|
| 2,815,132 A * | 12/1957 | Stone | .................. | B62B 3/04 182/141 |
| 2,828,870 A * | 4/1958 | Corley | .................. | B66C 7/00 182/141 |
| 3,058,602 A * | 10/1962 | Kilman | ............... | E04F 21/1822 254/3 C |
| 3,138,265 A * | 6/1964 | Hansen | ......................... | 414/428 |
| 3,221,900 A * | 12/1965 | Love | ............................... | 414/11 |
| 3,458,057 A * | 7/1969 | Stefan et al. | ................ | 414/778 |
| 3,643,935 A * | 2/1972 | Bell | ................................ | 269/16 |
| 3,923,167 A * | 12/1975 | Blankenbeckler | ............. | 414/11 |
| 4,339,219 A * | 7/1982 | Lay | ................................ | 414/11 |
| 4,810,151 A * | 3/1989 | Shern | ............................. | 414/11 |
| 5,984,605 A * | 11/1999 | Young | ............................ | 414/11 |
| 6,579,051 B2 * | 6/2003 | Echternacht | ................... | 414/11 |
| 2003/0190219 A1 * | 10/2003 | Young | ............................ | 414/11 |

OTHER PUBLICATIONS

Drill Drive Winch System, Model 1055, for TelPro Panellift, downloaded on May 17, 2013, from http://www.contractors-solutions.net/Drill-Drive-Model-1055-for-Panellift-P495.aspx.

* cited by examiner

*Primary Examiner* — Gerald McClain
*Assistant Examiner* — Lynn E Schwenning
(74) *Attorney, Agent, or Firm* — Walters & Wasylyna LLC

(57) ABSTRACT

In one aspect, an apparatus for manipulating a sheet includes a base portion, and an elevator portion coupled to the base portion, where the elevator portion is vertically movable relative to the base portion. The apparatus also includes a tilting portion pivotably coupled to the elevator portion, where a virtual plane is parallel to the tilting portion. In addition, the apparatus includes at least one first holder and at least one second holder coupled to the tilting portion, where at least one first holder and at least one second holder oppose each other.

20 Claims, 11 Drawing Sheets

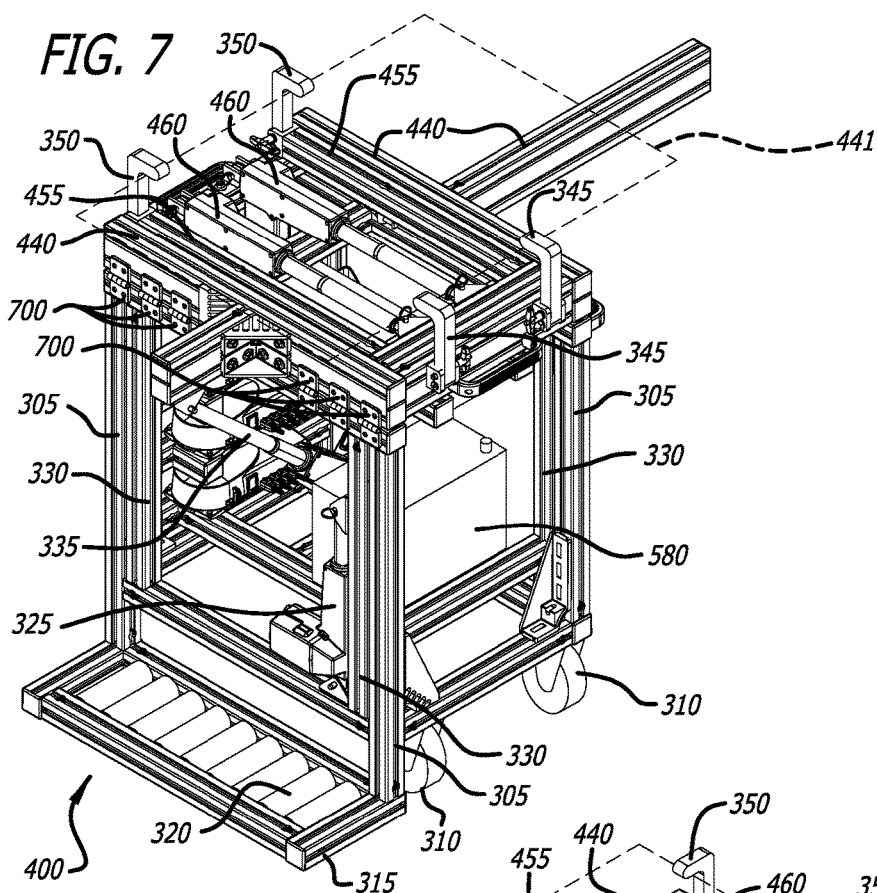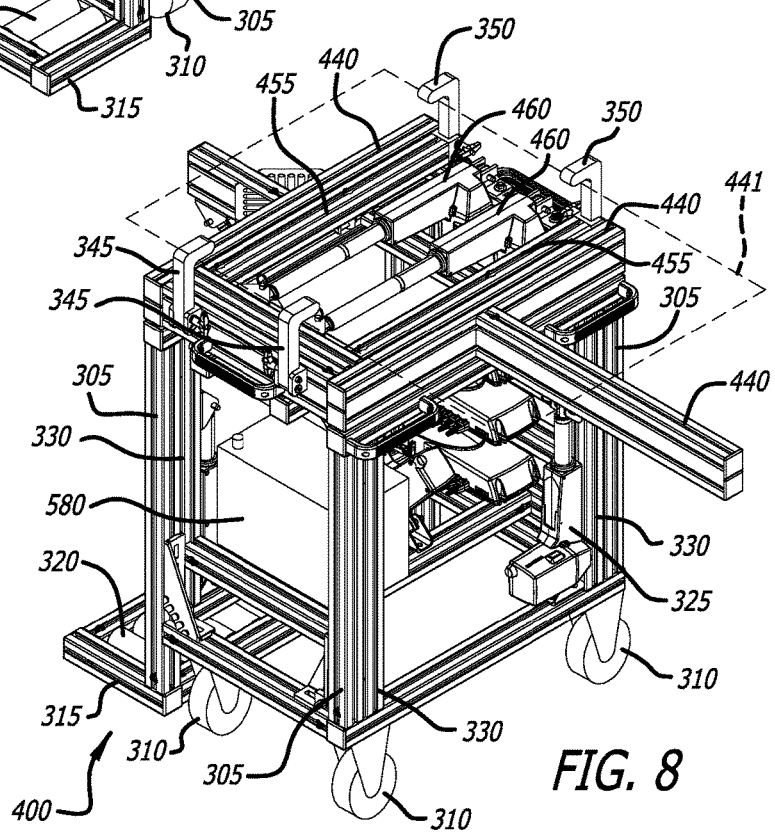

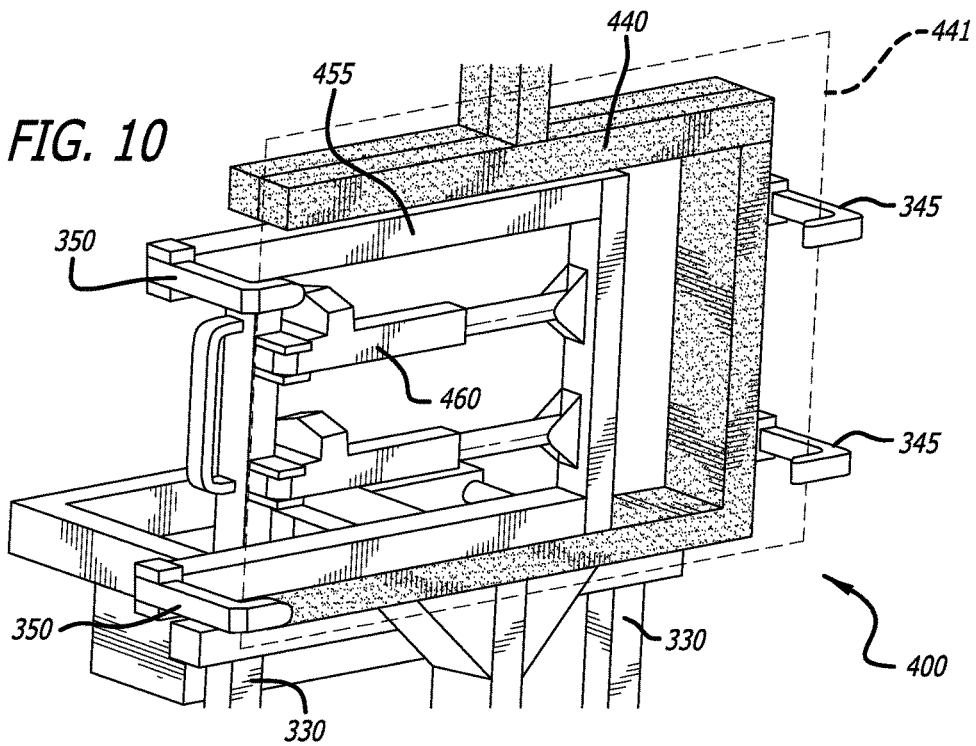
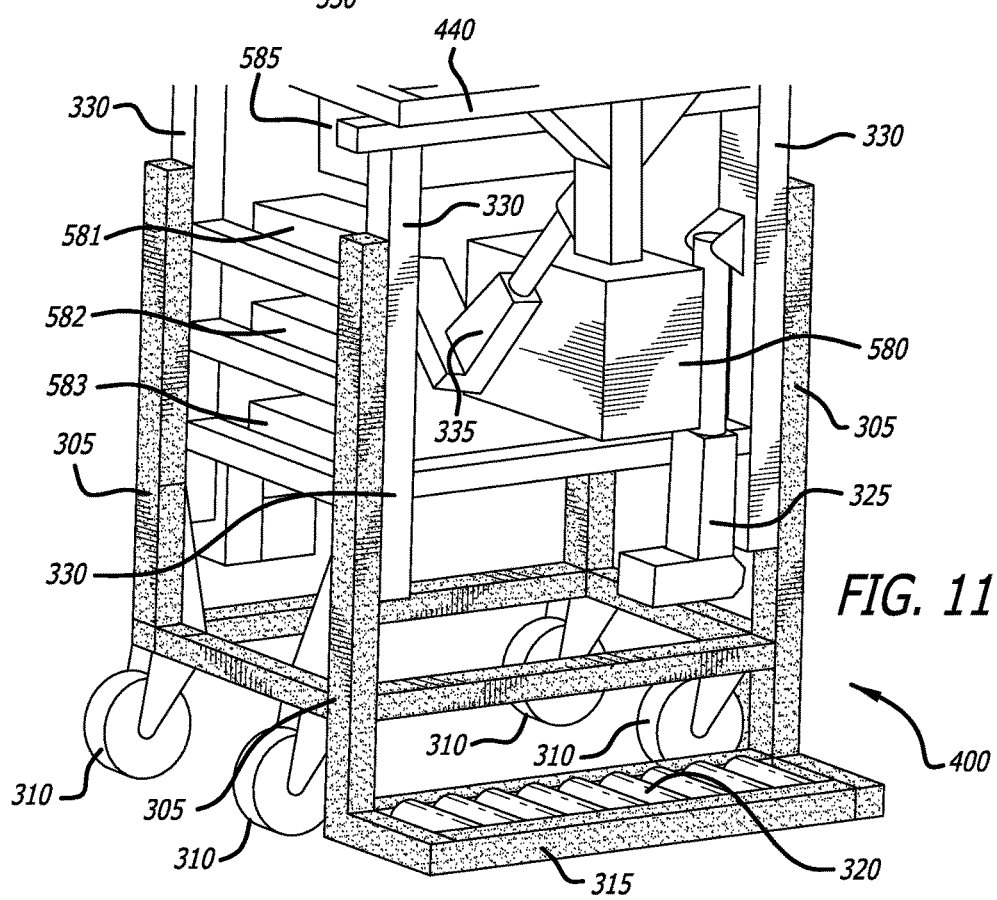

WIRE HARNESS FORMBOARD MANIPULATOR

BACKGROUND OF THE INVENTION

Due to their bulk (e.g., up to about 150 pounds) and size (e.g., up to about 50 inches wide and about 100 inches long), wire-harness formboards are typically transported to assembly workstations by operators, who must manually manipulate the formboards to position them onto the workstations. These manipulations of the formboards require considerable effort and multiple operators.

SUMMARY

Accordingly, an apparatus for manipulating wire-harness formboards, intended to address the above-identified concerns, would find utility.

One example of the present disclosure relates to an apparatus for manipulating a sheet. The apparatus includes a base portion, and an elevator portion coupled to the base portion, where the elevator portion is vertically movable relative to the base portion. The apparatus also includes a tilting portion pivotably coupled to the elevator portion, where a virtual plane is parallel to the tilting portion. In addition, the apparatus includes at least one first holder and at least one second holder coupled to the tilting portion, where at least one first holder and at least one second holder oppose each other.

In one aspect of the disclosure, which may include at least a portion of the subject matter of any of the preceding and/or following examples and aspects, at least one first holder is restrained from moving relative to the tilting portion along any direction in the virtual plane, and in the virtual plane, at least one second holder is movable relative to the tilting portion along one direction.

In one aspect of the disclosure, which may include at least a portion of the subject matter of any of the preceding and/or following examples and aspects, the apparatus also includes a sliding portion coupled to the tilting portion. The sliding portion is movable relative to the tilting portion along the one direction in the virtual plane. At least one first holder is coupled to the tilting portion, and at least one second holder is coupled to the sliding portion.

In one aspect of the disclosure, which may include at least a portion of the subject matter of any of the preceding and/or following examples and aspects, the apparatus also includes means for vertically translating the elevator portion relative to the base portion. The apparatus also includes means for pivoting the tilting portion relative to the elevator portion. In addition, the apparatus includes means for translating the sliding portion relative to the tilting portion.

In one aspect of the disclosure, which may include at least a portion of the subject matter of any of the preceding and/or following examples and aspects, at least one first holder is movable relative to the tilting portion along a direction orthogonal to the virtual plane, and at least one second holder is movable relative to the sliding portion along the direction orthogonal to the virtual plane.

In one aspect of the disclosure, which may include at least a portion of the subject matter of any of the preceding and/or following examples and aspects, the first holder is capable of being fixed relative to the tilting portion, and the second holder is capable of being fixed relative to the sliding portion.

In one aspect of the disclosure, which may include at least a portion of the subject matter of any of the preceding and/or following examples and aspects, in the virtual plane, at least one first holder and at least one second holder are movable relative to the tilting portion along one direction.

In one aspect of the disclosure, which may include at least a portion of the subject matter of any of the preceding and/or following examples and aspects, the apparatus also includes a first sliding portion and a second sliding portion coupled to the tilting portion. In the virtual plane, the first sliding portion and the second sliding portion are movable relative to the tilting portion along the one direction, at least one first holder is coupled to the first sliding portion, and at least one second holder is coupled to the second sliding portion.

In one aspect of the disclosure, which may include at least a portion of the subject matter of any of the preceding and/or following examples and aspects, the apparatus also includes means for vertically translating the elevator portion relative to the base portion, means for pivoting the tilting portion relative to the elevator portion, and means for translating the first sliding portion and the second sliding portion relative to the tilting portion.

In one aspect of the disclosure, which may include at least a portion of the subject matter of any of the preceding and/or following examples and aspects, at least one first holder is movable relative to the first sliding portion along a direction orthogonal to the virtual plane, and at least one second holder is movable relative to the second sliding portion along the direction orthogonal to the virtual plane.

In one aspect of the disclosure, which may include at least a portion of the subject matter of any of the preceding and/or following examples and aspects, the first holder is capable of being fixed relative to the first sliding portion, and the second holder is capable of being fixed relative to the second sliding portion.

In one aspect of the disclosure, which may include at least a portion of the subject matter of any of the preceding and/or following examples and aspects, the base portion includes a lower support.

In one aspect of the disclosure, which may include at least a portion of the subject matter of any of the preceding and/or following examples and aspects, the lower support includes a low-friction surface.

In one aspect of the disclosure, which may include at least a portion of the subject matter of any of the preceding and/or following examples and aspects, the low-friction surface includes at least one roller.

In one aspect of the disclosure, which may include at least a portion of the subject matter of any of the preceding and/or following examples and aspects, the lower support includes at least one wheel.

In one aspect of the disclosure, which may include at least a portion of the subject matter of any of the preceding and/or following examples and aspects, the tilting portion includes a low-friction surface coupled to the tilting portion.

In one aspect of the disclosure, which may include at least a portion of the subject matter of any of the preceding and/or following examples and aspects, the low-friction surface includes at least one roller.

In one aspect of the disclosure, which may include at least a portion of the subject matter of any of the preceding and/or following examples and aspects, the apparatus also includes a self-contained power source.

In one aspect of the disclosure, which may include at least a portion of the subject matter of any of the preceding and/or following examples and aspects, the base portion inlcudes wheels.

One example of the present disclosure relates to a method of manipulating a sheet using an apparatus. The method includes positioning the sheet in a substantially vertical orientation onto a base portion of the apparatus. The method also includes positioning a tilting portion of the apparatus, vertically movable relative to and pivotably coupled to the base portion, in the substantially vertical orientation. Also, the method includes clamping the sheet to the tilting portion using at least one first holder coupled to the tilting portion and at least one second holder coupled to the tilting portion. In addition, the method includes tilting the sheet to a substantially horizontal orientation by pivoting the tilting portion.

In one aspect of the disclosure, which may include at least a portion of the subject matter of any of the preceding and/or following examples and aspects, positioning the sheet onto the base portion also includes receiving the sheet onto a low-friction surface coupled to a lower support of the base portion.

In one aspect of the disclosure, which may include at least a portion of the subject matter of any of the preceding and/or following examples and aspects, the method also includes lifting the sheet relative to the base portion in the substantially vertical orientation.

In one aspect of the disclosure, which may include at least a portion of the subject matter of any of the preceding and/or following examples and aspects, the method also includes unclamping the sheet from the tilting portion.

In one aspect of the disclosure, which may include at least a portion of the subject matter of any of the preceding and/or following examples and aspects, the method also includes removing the sheet from the tilting portion in the substantially horizontal orientation. Removing the sheet also includes sliding the sheet along a low-friction surface coupled to the tilting portion.

In one aspect of the disclosure, which may include at least a portion of the subject matter of any of the preceding and/or following examples and aspects, the method also includes moving the base portion to transport the sheet.

BRIEF DESCRIPTION OF THE DRAWINGS

Figure 1:
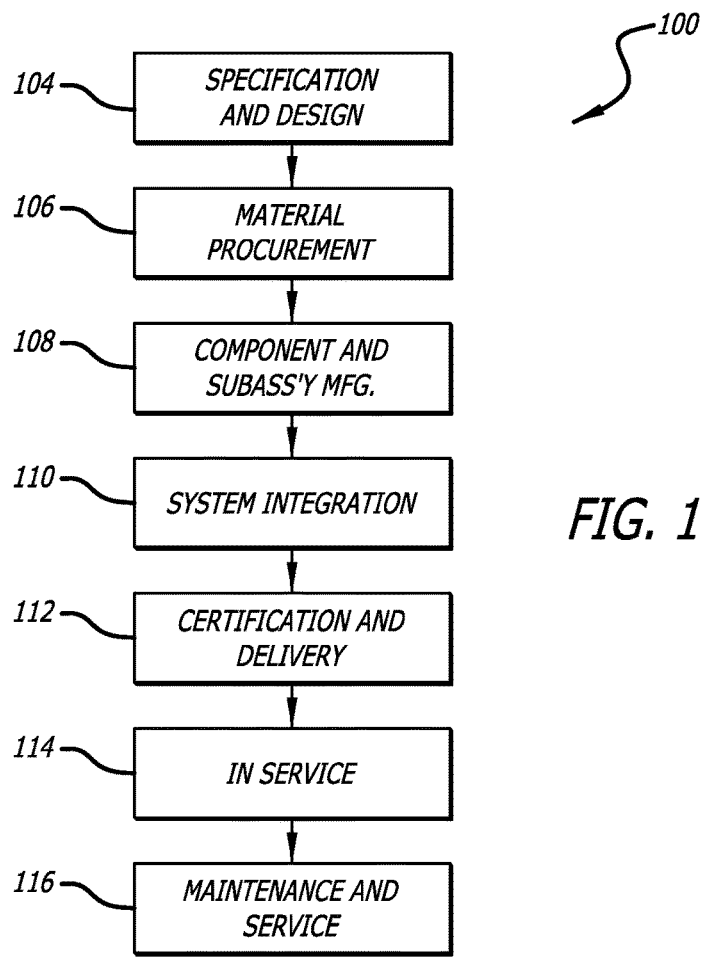
Figure 2:
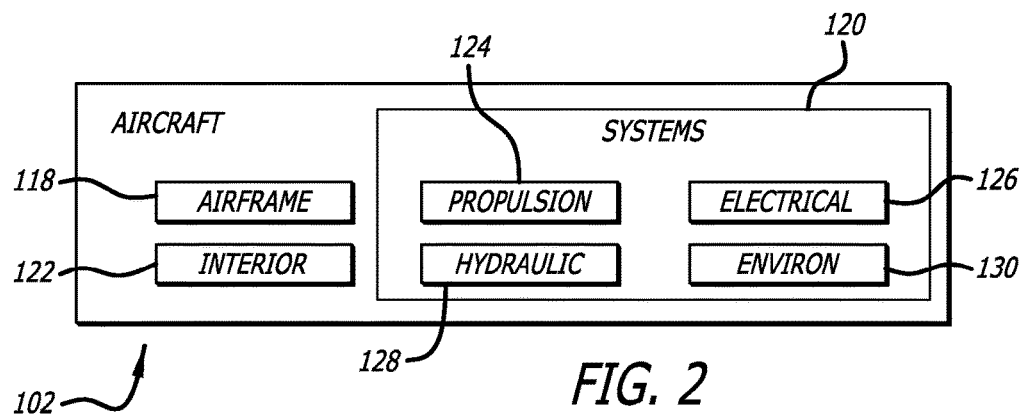
Figure 3:
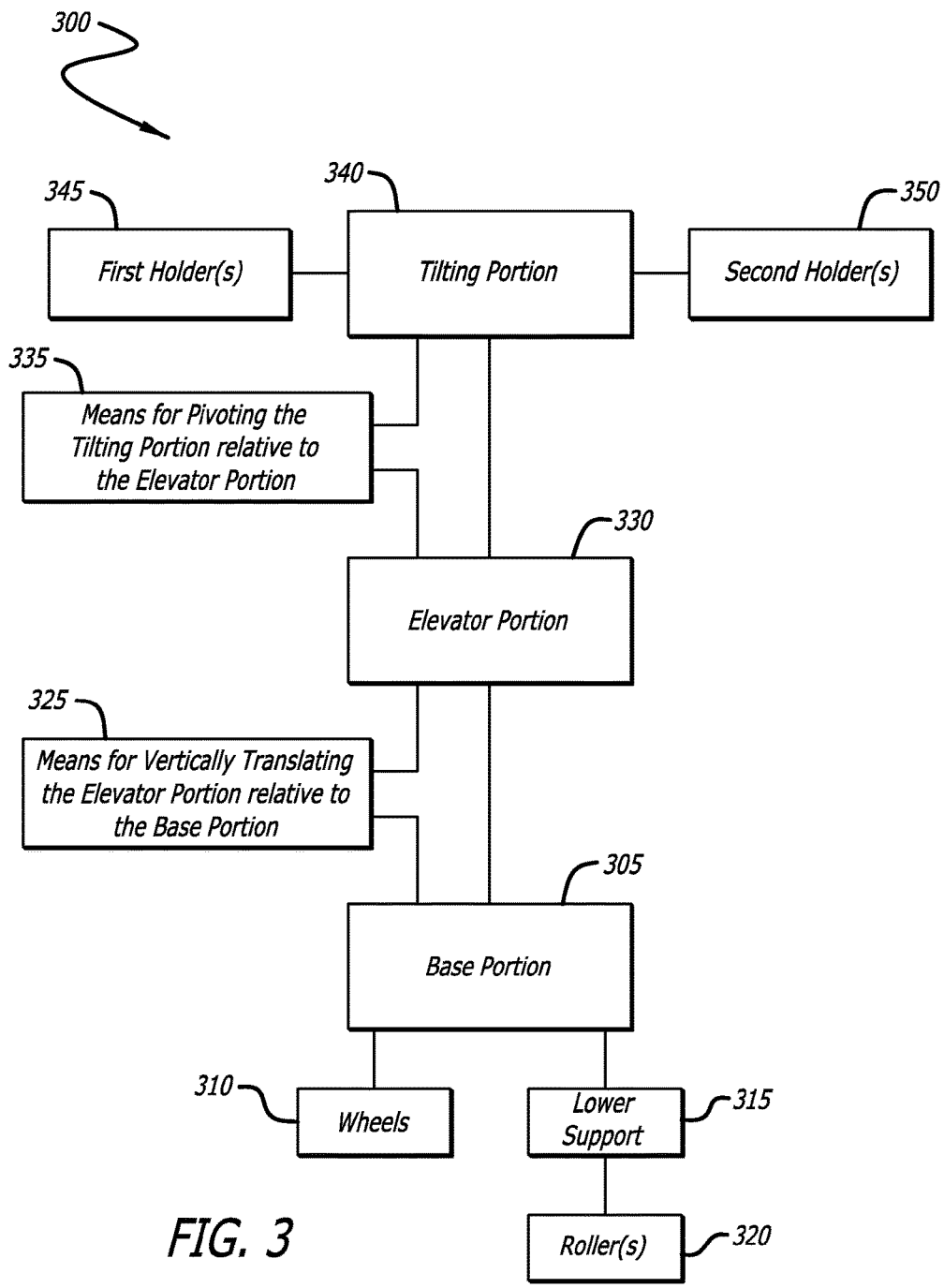
Figure 4:
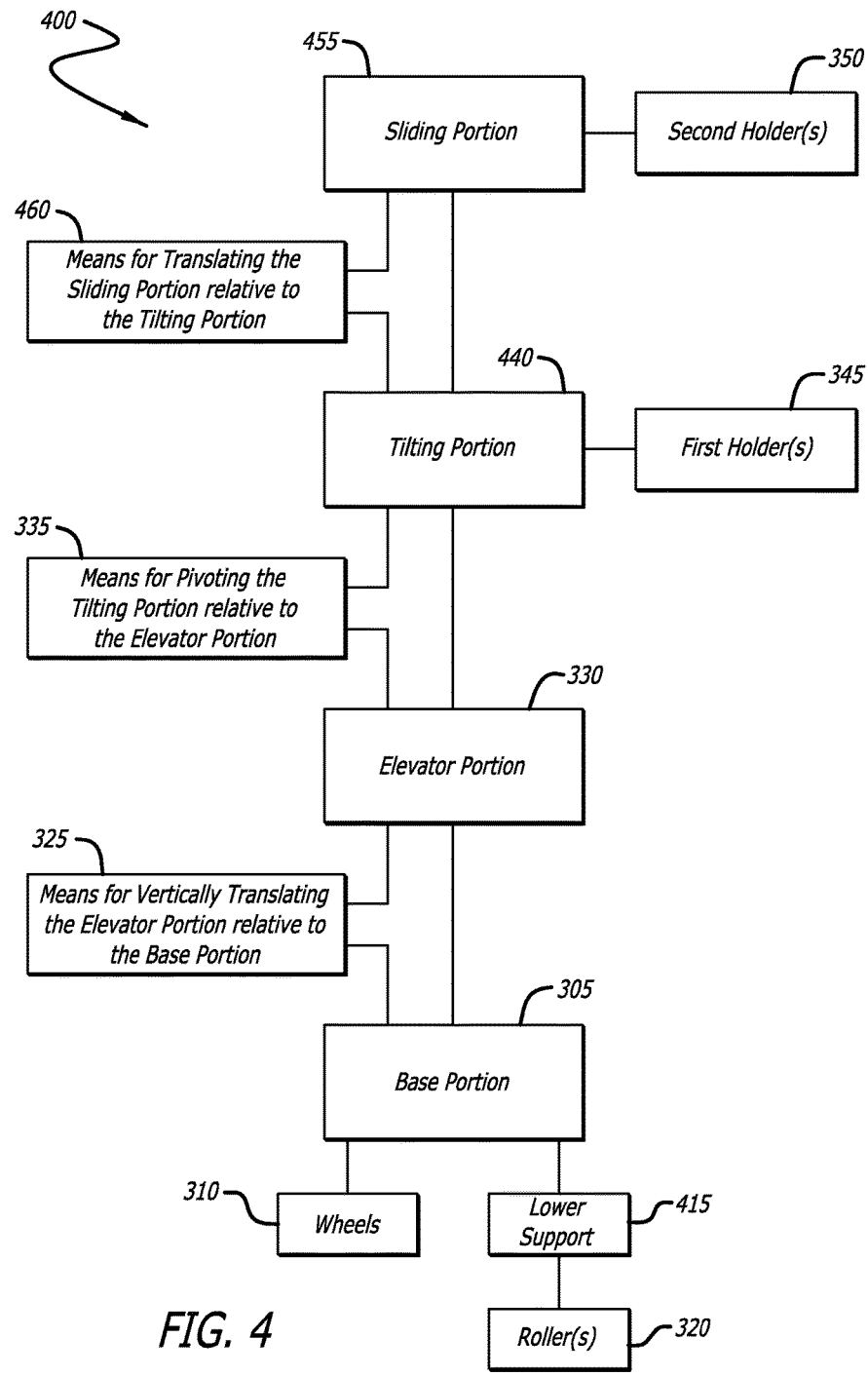
Figure 5:
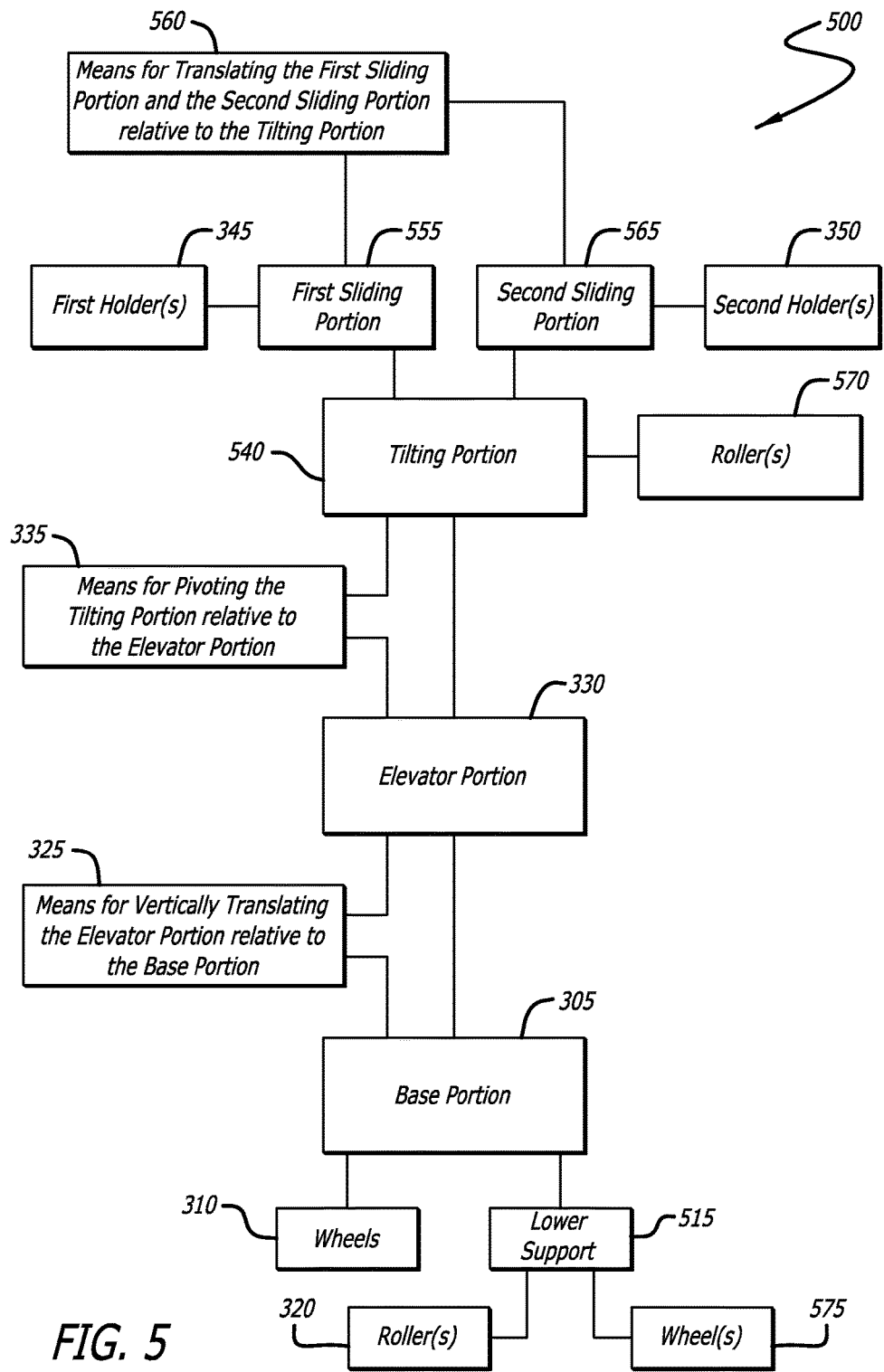
Figure 6:
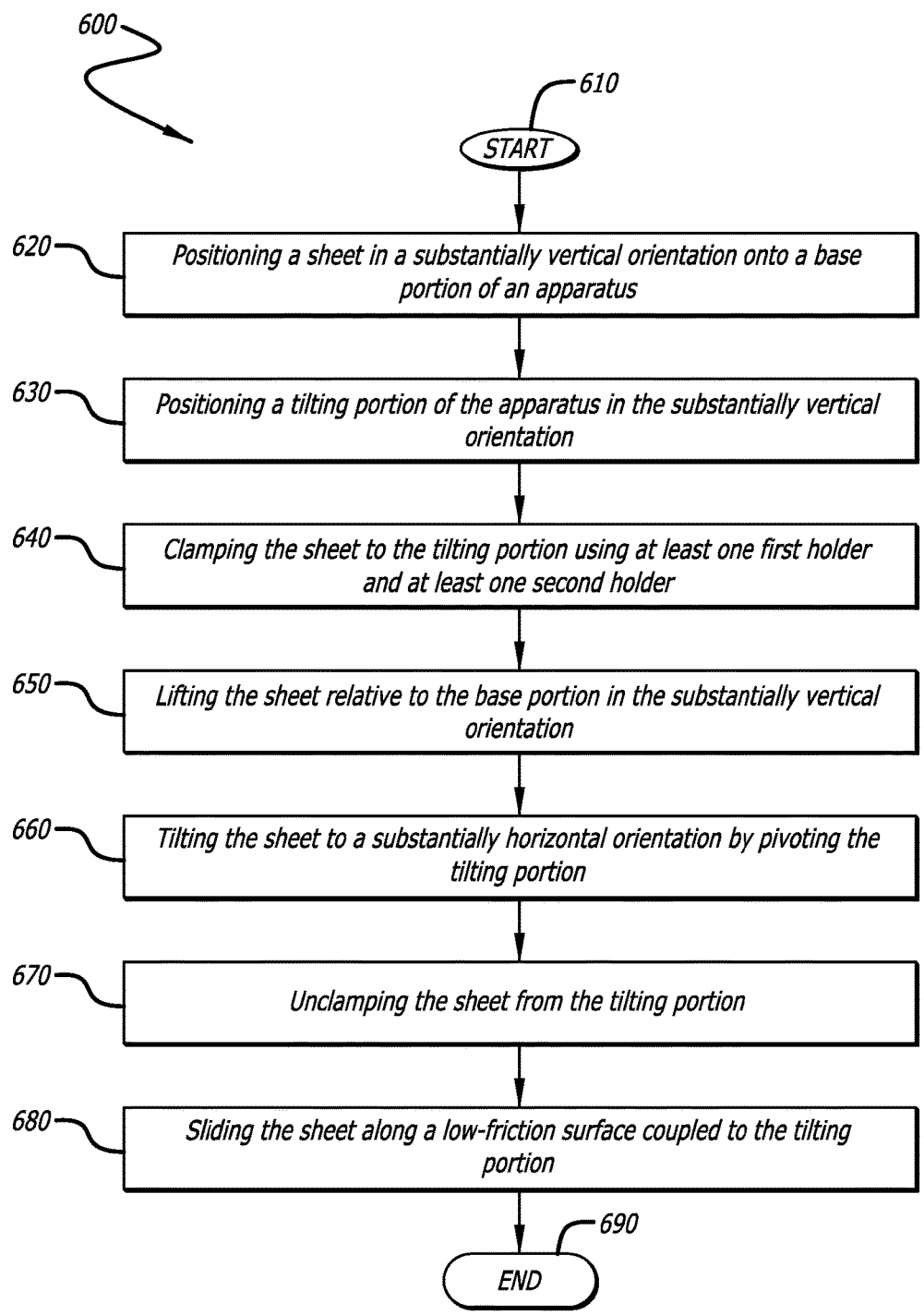
Figure 9:
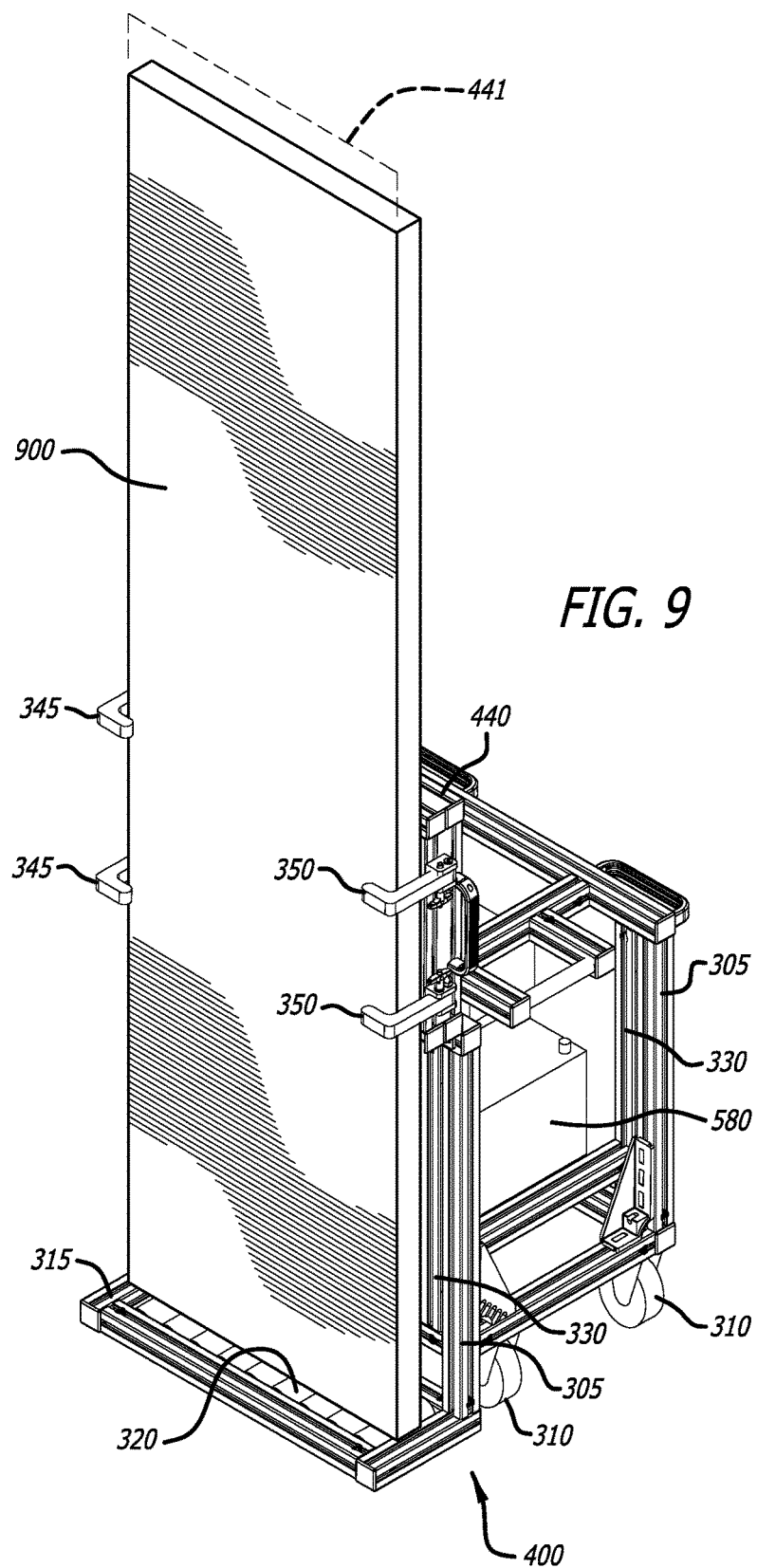
Figure 12:
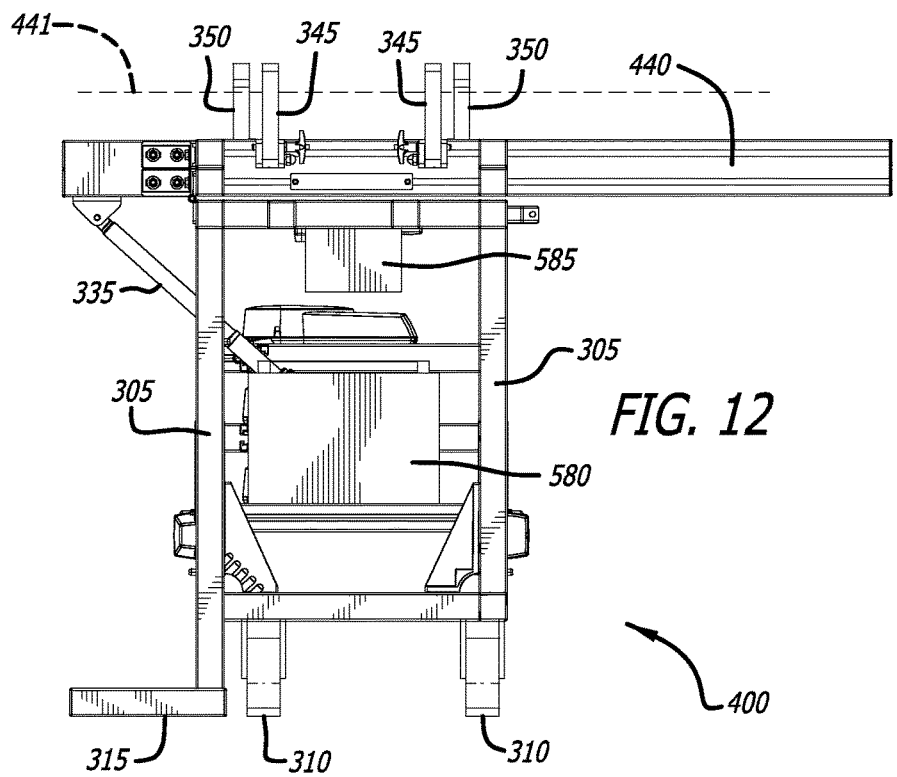
Figure 13:
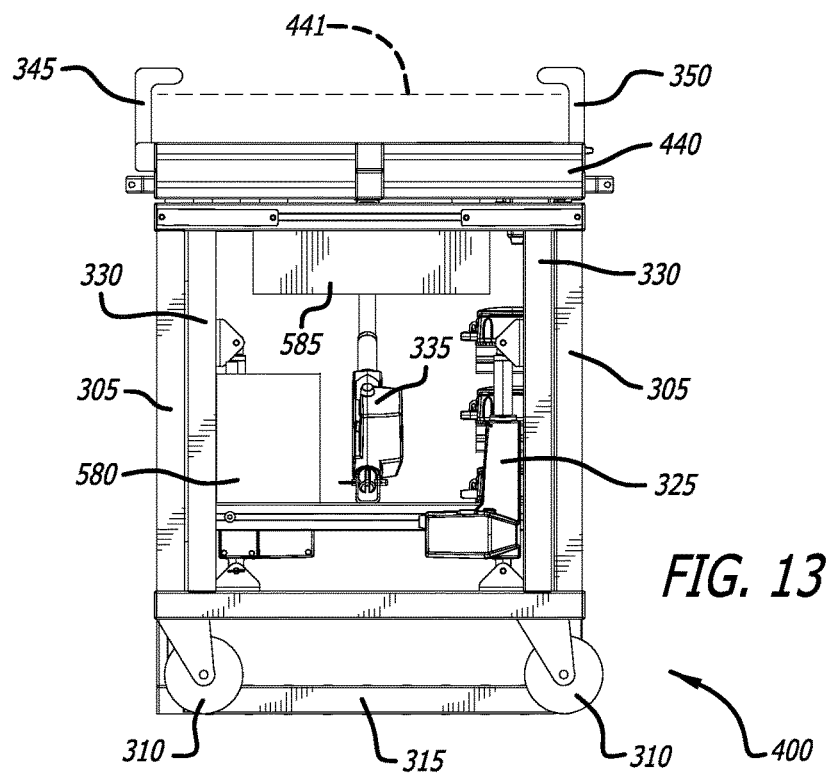
Figure 14:
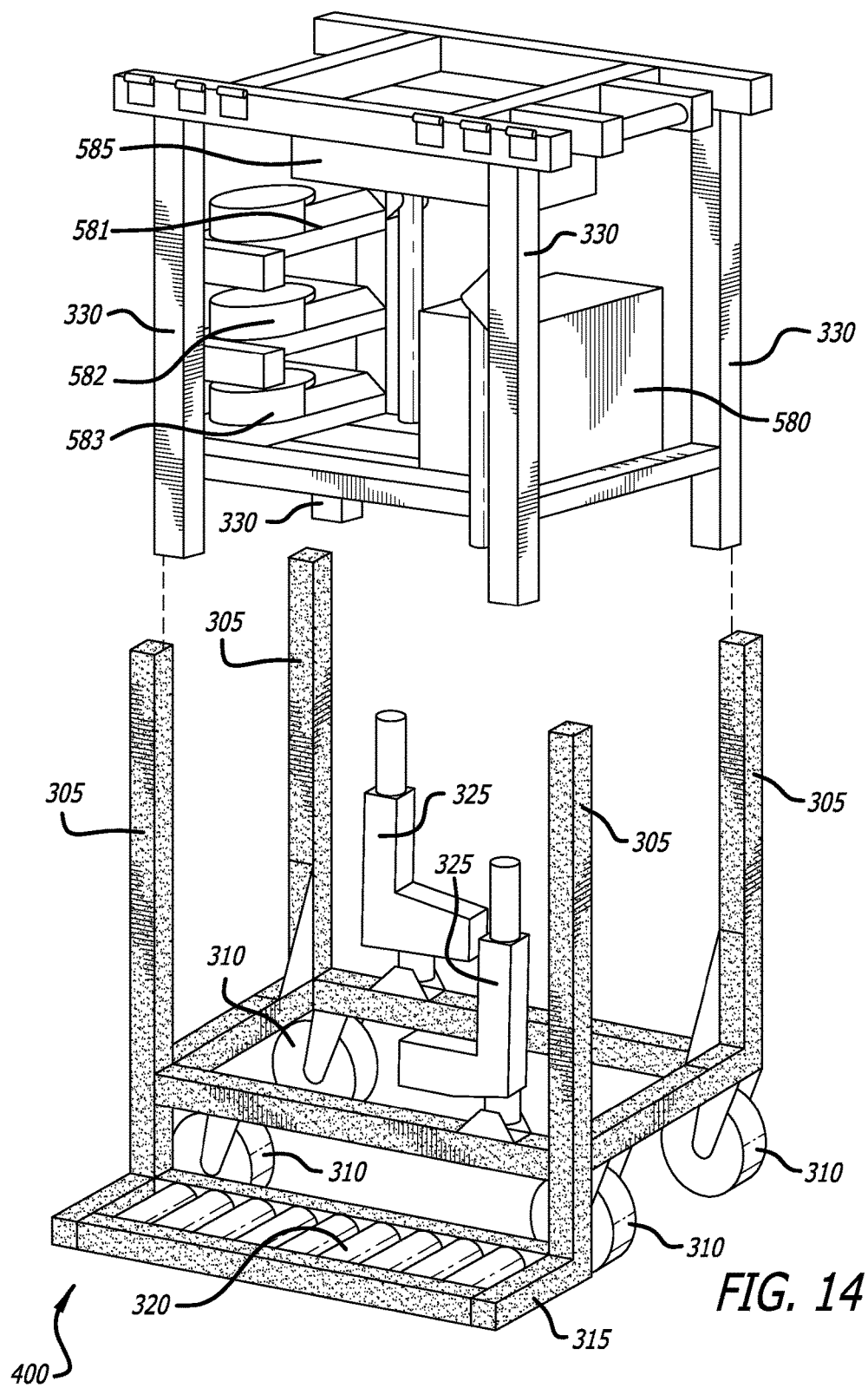
Figure 15:
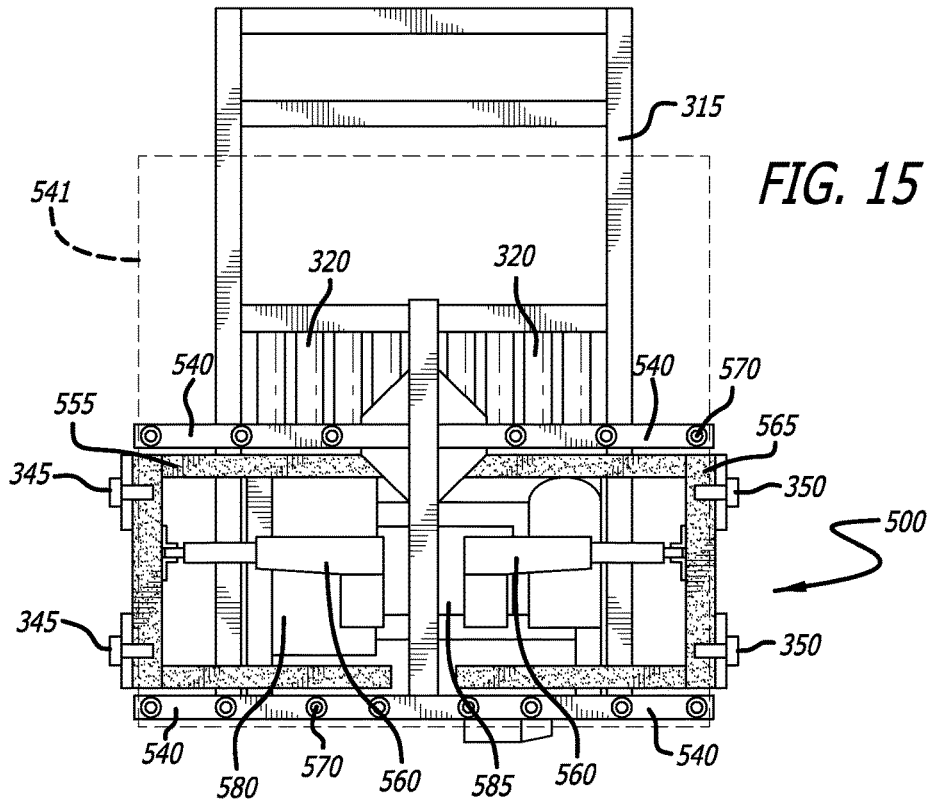
Figure 16:
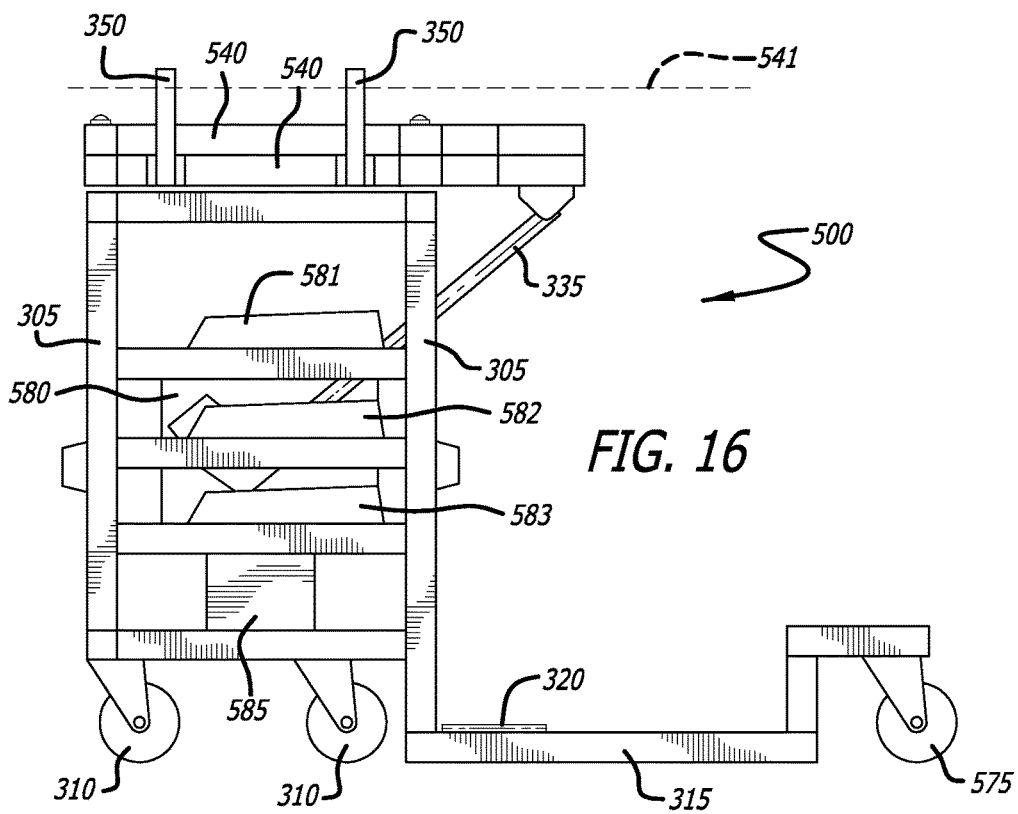

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology;

FIG. 2 is a block diagram of an aircraft;

FIG. 3 is a block diagram of an apparatus, according to an aspect of the present disclosure;

FIG. 4 is a block diagram of an apparatus, according to another aspect of the present disclosure;

FIG. 5 is a block diagram of an apparatus, according to yet another aspect of the present disclosure;

FIG. 6 is a flow diagram of a method, according to an aspect of the present disclosure;

FIG. 7 is a perspective view of the apparatus illustrated in FIGS. 3 and 4, according to an aspect of the present disclosure;

FIG. 8 is another perspective view of the apparatus illustrated in FIGS. 3 and 4, according to an aspect of the present disclosure;

FIG. 9 is a perspective view of the apparatus illustrated in FIGS. 3 and 4 with a sheet, according to an aspect of the present disclosure;

FIG. 10 is a perspective view of the upper portion of the apparatus illustrated in FIGS. 3 and 4, according to an aspect of the present disclosure;

FIG. 11 is a perspective view of the lower portion of the apparatus illustrated in FIGS. 3 and 4, according to an aspect of the present disclosure;

FIG. 12 is a perspective side view of the apparatus illustrated in FIGS. 3 and 4, according to an aspect of the present disclosure;

FIG. 13 is another perspective side view of the apparatus illustrated in FIGS. 3 and 4, according to an aspect of the present disclosure;

FIG. 14 is an exploded perspective view of the apparatus illustrated in FIGS. 3 and 4, according FIG. 15 is a perspective top view of the apparatus illustrated in FIGS. 3 and 5, according to an aspect of the present disclosure; and FIG. 16 is a perspective side view of the apparatus illustrated in FIGS. 3 and 5, according to an aspect of the present disclosure.

In the block diagrams referred to above, solid lines connecting various elements and/or components may represent mechanical and other couplings and/or combinations thereof. Couplings other than those depicted in the block diagrams may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

Examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft take place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, and so on).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 102 produced by the illustrative method 100 may include an airframe 118 with a plurality of high-level systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods shown or described herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or combination thereof may be utilized during the production states 108 and 110, for example, by substantially expediting assembly of or reducing the cost of an aircraft 102. Similarly, one or more of apparatus or method realizations, or a combination thereof, may be utilized, for example and without limitation, while the aircraft 102 is in service, e.g., maintenance and service 116.

As illustrated in FIGS. 3, 4, and 5, one example of the present disclosure relates to an apparatus 300, 400, 500 for manipulating a sheet (refer to FIG. 9 to view an exemplary sheet 900). The sheet 900 may be, for example, a piece of material (e.g., wood, composite, etc.) of some thickness, generally with a length exceeding its width and may contain electrical wiring (e.g., such as a wire-harness formboard). The apparatus includes a base portion 305, and an elevator portion 330 coupled to the base portion 305, where the elevator portion 330 is vertically movable relative to the base portion 305 (refer to FIGS. 11 and 14). The apparatus 300, 400, 500 also includes a tilting portion 340, 440, 540 pivotably coupled (e.g., by latches 700, refer to FIG. 7) to the elevator portion 330 (refer to FIGS. 10 and 16), where a virtual plane 441, 541 is parallel to the tilting portion 340, 440, 540 (refer to FIGS. 7, 8, and 16). In addition, the apparatus includes at least one first holder 345 and at least one second holder 350 coupled to the tilting portion 340, 440, 540, where at least one first holder 345 and at least one second holder 350 oppose each other (refer to FIGS. 10 and 15). As used herein, the term "coupled" means associated directly as well as indirectly. For example, holder 345 may be directly attached to the tilting portion 340, 440, 540, or may be indirectly associated therewith, e.g., via another portion or member of the apparatus 300, 400, 500.

Referring to FIGS. 4 and 10, in one aspect of the disclosure, at least one first holder 345 is restrained from moving relative to the tilting portion 440 along any direction in the virtual plane 441, and in the virtual plane 441, at least one second holder 350 is movable relative to the tilting portion 440 along one direction. The apparatus 400 also includes a sliding portion 455 coupled to the tilting portion 440. The sliding portion 455 is movable relative to the tilting portion 440 along the one direction in the virtual plane 441, at least one first holder 345 is coupled to the tilting portion 440, and at least one second holder 350 is coupled to the sliding portion 455.

Referring to FIGS. 4, 7, 10 and 11, in one aspect of the disclosure, the apparatus 400 also includes means 325 for vertically translating the elevator portion 330 relative to the base portion 305. The apparatus 400 also includes means 335 for pivoting the tilting portion 440 relative to the elevator portion 330. In addition, the apparatus 400 includes means 460 for translating the sliding portion 455 relative to the tilting portion 440. Various types of actuators may be employed as the means 325 for vertically translating, the means 335 for pivoting, and the means 460 for translating. Commercially available actuators that may be employed include, but are not limited to, a Linak actuator with a 200 millimeter (mm) stroke and a Linak actuator with a 300 mm stroke, both manufactured by Linak U.S. Inc., Louisville, Ky. Also, actuator-control boxes 581, 582, 583 may be employed to control the actuators. Commercially available actuator control boxes that may be employed include, but are not limited to, Linak actuator control boxes, manufactured by Linak U.S. Inc., Louisville, Ky. Referring to FIGS. 4 and 10, in one aspect of the disclosure, at least one first holder 345 is movable relative to the tilting portion 440 along a direction orthogonal to the virtual plane 441, and at least one second holder 350 is movable relative to the sliding portion 455 along the direction orthogonal to the virtual plane 441. The first holder 345 is capable of being fixed relative to the tilting portion 440, and the second holder 350 is capable of being fixed relative to the sliding portion 455.

Referring to FIGS. 5, 15, and 16, in one aspect of the disclosure, in the virtual plane 541, at least one first holder 345 and at least one second holder 350 are movable relative to the tilting portion 540 along one direction. The apparatus 500 also includes a first sliding portion 555 and a second sliding portion 565 coupled to the tilting portion 540. In the virtual plane 541, the first sliding portion 555 and the second sliding portion 565 are movable relative to the tilting portion 540 along the one direction, at least one first holder 345 is coupled to the first sliding portion 555, and at least one second holder 350 is coupled to the second sliding portion 565. The apparatus 500 also includes means 325 for vertically translating the elevator portion 330 relative to the base portion 305, means 335 for pivoting the tilting portion 540 relative to the elevator portion 330, and means 560 for translating the first sliding portion 555 and the second sliding portion 565 relative to the tilting portion 540. Different types of actuators may be employed as the means 325 for vertically translating, the means 335 for pivoting, and the means 560 for translating. Commercially available actuators that may be employed include, but are not limited to, a Linak actuator with a 200-mm stroke and a Linak actuator with a 300-mm stroke, both manufactured by Linak U.S. Inc., Louisville, Ky. In addition, actuator control boxes 581, 582, 583 may be employed to control the actuators. Commercially available actuator control boxes that may be employed include, but are not limited to, Linak actuator control boxes manufactured by Linak U.S. Inc., Louisville, Ky. At least one first holder 345 is movable relative to the first sliding portion 555 along a direction orthogonal to the virtual plane 541, and at least one second holder 350 is movable relative to the second sliding portion 565 along the direction orthogonal to the virtual plane 541. The first holder 345 is capable of being fixed relative to the first sliding portion 555, and the second holder 350 is capable of being fixed relative to the second sliding portion 565.

Referring to FIGS. 4, 5, 14, 15, and 16, in one aspect of the disclosure, the base portion 305 comprises a lower support 315. The lower support 315 comprises a low-friction surface. The low-friction surface comprises at least one roller 320. Different types of rollers may be employed for the roller(s) 320. Commercially available rollers that may be employed include, but are not limited to, six inch dowel rollers manufactured by McMaster Can, Santa Fe Springs, Calif. Referring to FIGS. 5 and 16, in one aspect of the disclosure for apparatus 500, the lower support 315 comprises at least one wheel 575. Various types of wheels may be employed for the wheel(s) 575. Commercially available wheels that may be employed include, but are not limited to, 125-mm caster floor-protector non-lock wheels and 125-mm caster floor-protector lock wheels manufactured by Bosch, Stuttgart, Germany.

Referring to FIGS. 5, 15 and 16, in one aspect of the disclosure, the tilting portion 540 comprises a low-friction surface coupled to the tilting portion 540. The low-friction surface comprises at least one roller 570 (see FIGS. 5 and 15). Different types of rollers may be employed for the roller(s) 570 including, but not limited to ball rollers, ball casters, and dowels.

Referring to FIGS. 14, 15, and 16, in one aspect of the disclosure, the apparatus 400, 500 also includes a self-contained power source 580. The self-contained power source 580 may be a battery. Commercially available batteries that may be employed for the self-contained power source 580 include, but are not limited to, a sealed lead acid battery manufactured by McMaster Carr, Santa Fe Springs, Calif. In addition, a direct current-alternating current (DC-AC) converter 585 may be employed to convert the DC power generated by the battery (i.e. the self-contained power source 580) to AC power for the actuators (i.e., the means 325 for vertically translating, the means 335 for pivoting, and the means 460, 560 for translating). Various types of DC-AC converters may be employed for the DC-AC converter 585. Commercially available DC-AC converters that may be employed include, but are not limited to, a DC-AC converter manufactured by McMaster Carr, Santa Fe Springs, Calif.

Referring to FIGS. 14, 15, and 16, in one aspect of the disclosure, the base portion comprises wheels 310. Different types of wheels may be employed for the wheels 310. Commercially available wheels that may be employed include, but are not limited to, 125-mm caster floor protector non-lock wheels and 125-mm caster floor protector lock wheels manufactured by Bosch, Stuttgart, Germany.

One example of the present disclosure relates to a method 600 (refer to FIG. 6) of manipulating the sheet 900 (refer to FIG. 9 to view an exemplary sheet 900) using the apparatus 300, 400, 500 (refer to FIGS. 3, 4, and 5). At the start (refer to step 610 of FIG. 6) of the method 600, the method includes positioning the sheet 900 in a substantially vertical orientation onto the base portion 305 of the apparatus 300, 400, 500 (refer to step 620 of FIG. 6). Positioning the sheet 900 onto the base portion 305 also includes receiving the sheet 900 onto a low-friction surface coupled to a lower support 315, 415 of the base portion 305. The method 600 also includes positioning a tilting portion 340, 440 of the apparatus 300, 400, 500, vertically movable relative to and pivotably coupled to the base portion 305, in the substantially vertical orientation (refer to step 630 of FIG. 6). Also, the method includes clamping the sheet 900 to the tilting portion 340, 440 using at least one first holder 345 coupled to the tilting portion 340, 440 and at least one second holder 350 coupled to the tilting portion 340, 440 (refer to step 640 of FIG. 6). The method also includes lifting the sheet 900 relative to the base portion 305 in the substantially vertical orientation (refer to step 650 of FIG. 6). The method also includes moving the base portion 305 to transport the sheet 900. In addition, the method includes tilting the sheet 900 to a substantially horizontal orientation by pivoting the tilting portion 340, 440 (refer to step 660 of FIG. 6). The method also includes unclamping the sheet 900 from the tilting portion 340, 440 (refer to step 670 of FIG. 6). The method also includes removing the sheet 900 from the tilting portion 340, 440 in the substantially horizontal orientation. Removing the sheet 900 also includes sliding the sheet 900 along a low-friction surface coupled to the tilting portion 340, 440 (refer to step 680 of FIG. 6). The method 600 terminates at step 690 (FIG. 6).

The drawing figure(s) illustrating the operations of the disclosed method should not be interpreted as necessarily determining a sequence in which the operations are to be performed. Rather, although one illustrative order is indicated, it is to be understood that the sequence of the operations may be modified when appropriate.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

The invention claimed is:

1. An apparatus for manipulating a sheet, the apparatus comprising:
    a base portion;
    an elevator portion coupled to the base portion, wherein the elevator portion is vertically movable relative to the base portion;
    a tilting portion pivotably coupled to the elevator portion, the tilting portion comprising at least one roller arranged to facilitate translational movement of the sheet relative to the tilting portion along an axis, wherein a virtual plane is parallel to the tilting portion and the axis, and wherein the tilting portion is pivotable relative to the elevator portion between, inclusively, a first orientation, in which the virtual plane is vertically oriented, and a second orientation, in which the virtual plane is horizontally oriented; and
    at least one first holder and at least one second holder coupled to the tilting portion, wherein the at least one first holder and the at least one second holder are laterally opposed from each other with respect to the axis, wherein the at least one first holder is restrained from moving relative to the tilting portion along any direction in the virtual plane and, in the virtual plane, the at least one second holder is movable relative to the tilting portion along one direction.

2. The apparatus of claim 1, further including a sliding portion coupled to the tilting portion, wherein
    the sliding portion is movable relative to the tilting portion along the one direction in the virtual plane,
    the at least one first holder is coupled to the tilting portion, and
    the at least one second holder is coupled to the sliding portion.

3. The apparatus of claim 2, further comprising
means for vertically translating the elevator portion relative to the base portion;
means for pivoting the tilting portion relative to the elevator portion; and
means for translating the sliding portion relative to the tilting portion.

4. The apparatus of claim 1, wherein
in the virtual plane, the at least one first holder and the at least one second holder are movable relative to the tilting portion along one direction.

5. The apparatus of claim 4, further including a first sliding portion and a second sliding portion coupled to the tilting portion, wherein
in the virtual plane, the first sliding portion and the second sliding portion are movable relative to the tilting portion along the one direction,
the at least one first holder is coupled to the first sliding portion, and
the at least one second holder is coupled to the second sliding portion.

6. The apparatus of claim 5, further comprising
means for vertically translating the elevator portion relative to the base portion;
means for pivoting the tilting portion relative to the elevator portion; and
means for translating the first sliding portion and the second sliding portion relative to the tilting portion.

7. The apparatus of claim 1, wherein the base portion comprises a lower support.

8. The apparatus of claim 7, wherein the lower support comprises at least one roller.

9. The apparatus of claim 7, wherein the lower support comprises a plurality of rollers.

10. The apparatus of claim 1, further comprising a self-contained power source.

11. The apparatus of claim 1, wherein the at least one first holder and the at least one second holder are configured to clamp the sheet to the tilting portion.

12. The apparatus of claim 1, wherein the base portion comprises at least one wheel.

13. A method of manipulating a sheet using an apparatus, the method comprising:
positioning the sheet in a substantially vertical orientation onto a base portion of the apparatus;
positioning a tilting portion of the apparatus, vertically movable relative to and pivotably coupled to the base portion via an elevator portion, in the substantially vertical orientation;
clamping the sheet to the tilting portion using at least one first holder coupled to the tilting portion and at least one second holder coupled to the tilting portion, wherein the first holder and the second holder are laterally opposed from each other with respect to an axis, wherein the at least one first holder is restrained from moving relative to the tilting portion and the at least one second holder is movable relative to the tilting portion along one direction;
tilting the sheet to a substantially horizontal orientation by pivoting the tilting portion; and
with the sheet in the horizontal orientation, sliding the sheet relative to the tilting portion along the axis.

14. The method of claim 13, wherein positioning the sheet onto the base portion further comprises receiving the sheet onto at least one roller coupled to a lower support of the base portion.

15. The method of claim 13, further comprising lifting the sheet relative to the base portion in the substantially vertical orientation.

16. The method of claim 13, further comprising unclamping the sheet from the tilting portion.

17. The method of claim 13 wherein sliding the sheet relative to the tilting portion along the axis comprises sliding the sheet along at least one roller coupled to the tilting portion.

18. The method of claim 13, wherein the base portion comprises a lower support and the lower support comprises at least one roller.

19. The method of claim 13, further comprising moving the base portion to transport the sheet.

20. The method of claim 13, wherein the sheet is a wire-harness formboard.

* * * * *